US006946181B2

(12) United States Patent
Prévost

(10) Patent No.: US 6,946,181 B2
(45) Date of Patent: Sep. 20, 2005

(54) ARTIFICIAL GRASS FOR LANDSCAPING

(75) Inventor: Jean Prévost, Westmount (CA)

(73) Assignee: Fieldturf Inc. (CA)

( * ) Notice: Subject to any disclaimer, the term of this patent is extended or adjusted under 35 U.S.C. 154(b) by 145 days.

(21) Appl. No.: 10/363,538

(22) PCT Filed: Sep. 5, 2001

(86) PCT No.: PCT/CA01/01275

§ 371 (c)(1),
(2), (4) Date: Jun. 3, 2003

(87) PCT Pub. No.: WO02/20903

PCT Pub. Date: Mar. 14, 2002

(65) Prior Publication Data

US 2003/0182855 A1 Oct. 2, 2003

Related U.S. Application Data

(60) Provisional application No. 60/220,601, filed on Sep. 5, 2000, and provisional application No. 60/277,274, filed on Mar. 3, 2001.

(51) Int. Cl.[7] ............................................. B32B 33/00
(52) U.S. Cl. ........................... 428/87; 428/17; 428/143; 428/402; 47/1.01 F; 405/50; 405/271; 119/713
(58) Field of Search ............................. 428/15, 17, 85, 428/87, 141, 143, 402; 47/1.01 F; 405/36, 50, 271; 119/712, 713

(56) References Cited

U.S. PATENT DOCUMENTS

| 4,044,179 A | 8/1977 | Haas, Jr. |
| 4,047,491 A | 9/1977 | Spanel et al. |
| 4,216,735 A | 8/1980 | McDaniel, Jr. |
| 4,396,653 A | 8/1983 | Tomarin |
| 4,755,401 A | 7/1988 | Friedrich et al. |
| 5,013,029 A | 5/1991 | Vaux |
| 5,206,058 A | 4/1993 | Fry et al. |
| 5,392,723 A | 2/1995 | Kaju |
| 5,439,968 A | 8/1995 | Hyche |
| 5,932,357 A | 8/1999 | Coates et al. |
| 6,039,767 A | 3/2000 | Boyes et al. |
| 6,247,267 B1 * | 6/2001 | Motz et al. ............... 47/58.1 R |

FOREIGN PATENT DOCUMENTS

CA  2238953  11/1999

OTHER PUBLICATIONS

Bird–strike Solutions Spurred by Imagination, Innovation, Flight Safety Foundation Airport Operations, Mar.–Apr. 1995.
Deposition of James Greif, Nov. 25, 2003, in the litigation case of Airport Surface Technologies, LLC and AvTurf, LLC v. FieldTurf, Inc.
Airport Land Uses Require Planning to Prevent Wildlife–Aircraft Strikes, Flight Safety Foundation Airport Operations, Jul.–Aug. 1997.
*Airport Wildlife Management, Online! 1995, XP002185559, Retrieved from the Internet: <URL: www.tc.gc.ca/aviation/aerodrme/birdstke/bulletin/awb16.htm>, retrieved on Dec. 13, 2001, Program–Related Highlights: Ground Cover p. 7.

* cited by examiner

Primary Examiner—Deborah Jones
Assistant Examiner—Wendy Boss
(74) Attorney, Agent, or Firm—Factor & Lake

(57) ABSTRACT

An artificial grass surface (10) suited for bordering a runway (12) of an airfield in order to reduce the presence of birds in the airfield. The artificial grass surface (10) includes a pile fabric (14) having a plurality of pile elements (20) extending from a backing mat (18) and resembling grass. A water barrier (24) is provided for preventing water from percolating to the compacted soil surface. An infilled particulate material (22) is dispersed among the pile elements (20). A stabilizer is provided to resist dislodgment of the infilled particulate material (22) at the edges of the runways by the thrust of jet engines and to keep the particulate material (22) in the pile elements (20) when the edges of the runways are vacuumed to remove silt.

34 Claims, 2 Drawing Sheets

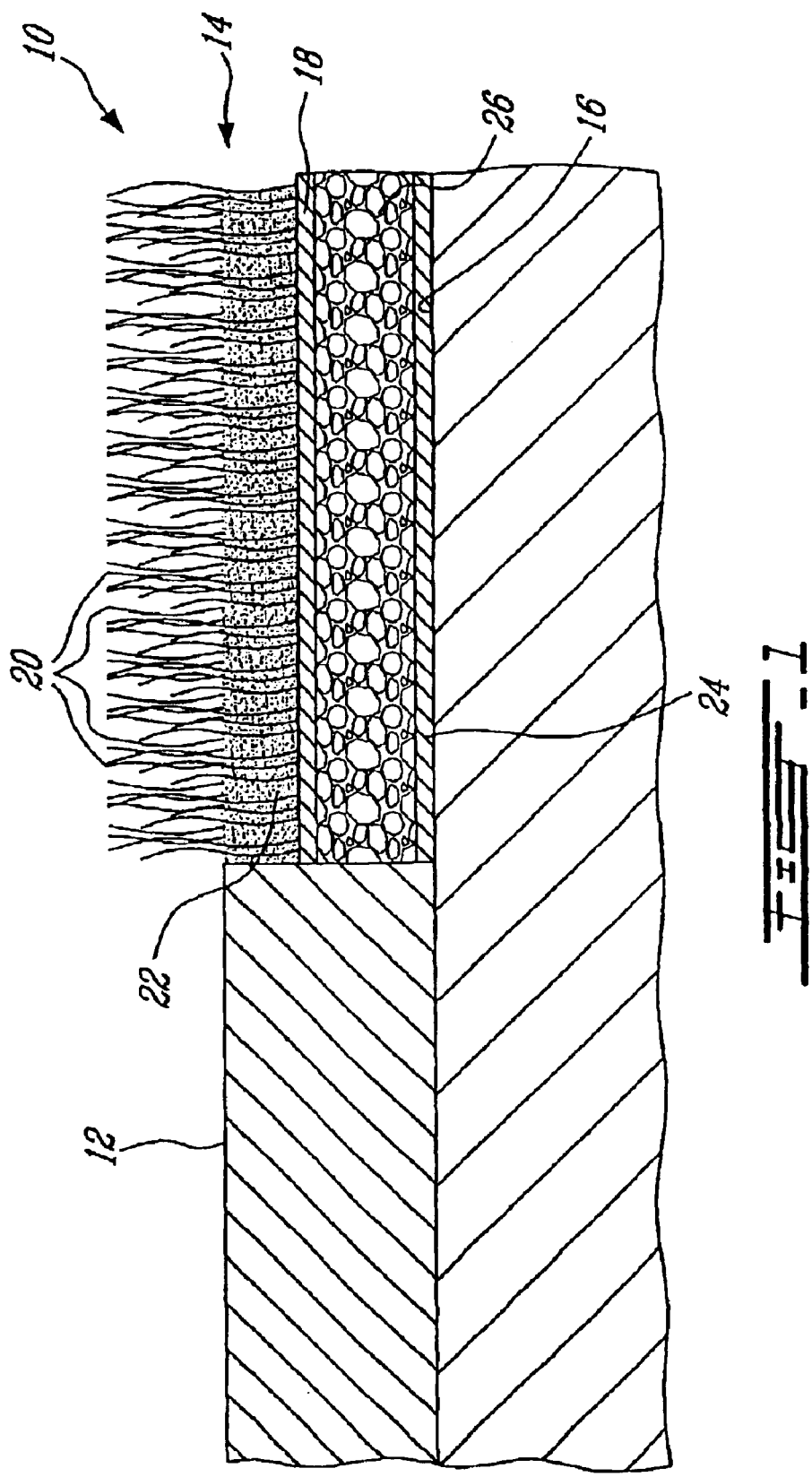

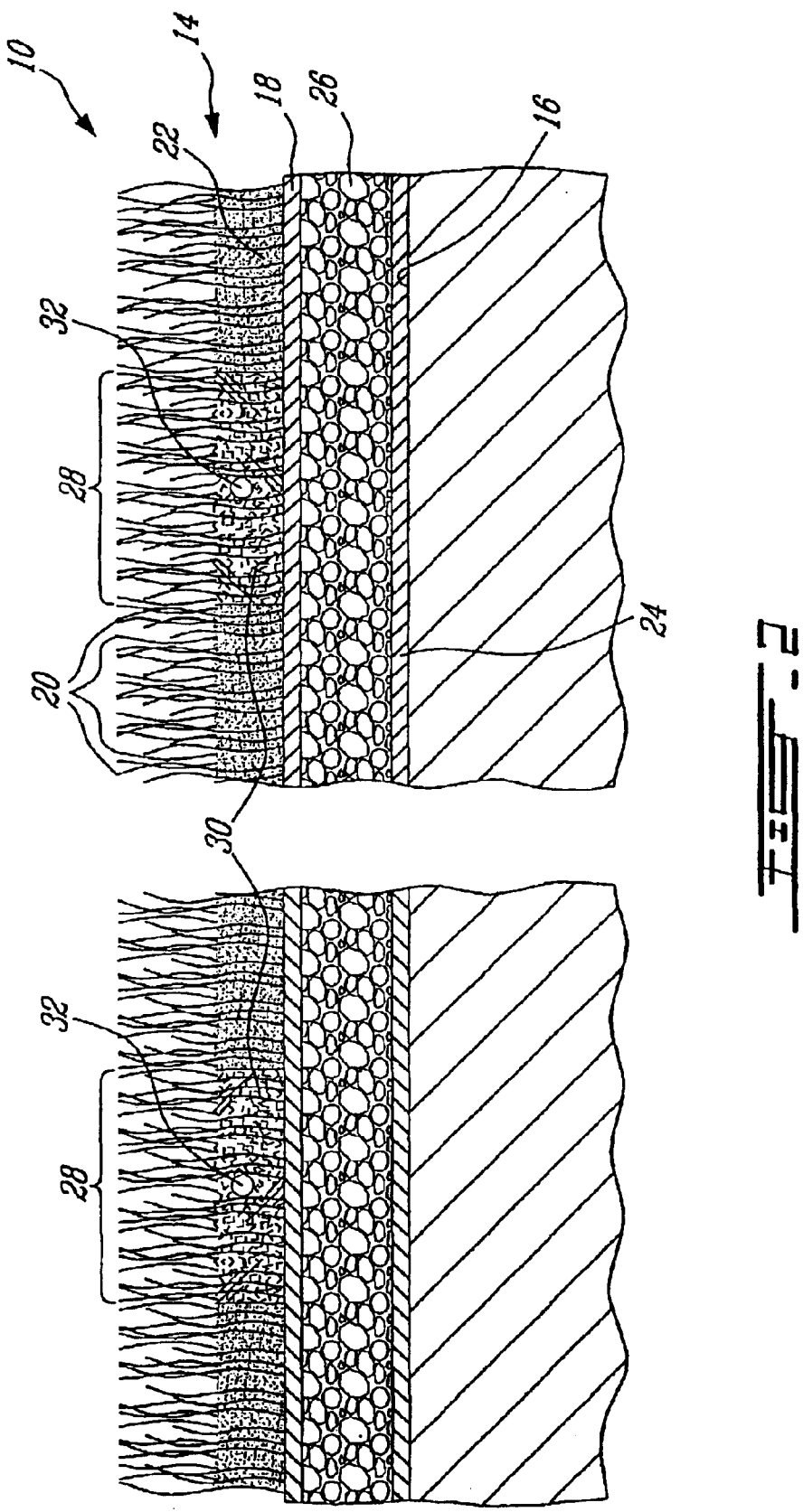

ARTIFICIAL GRASS FOR LANDSCAPING

This application is the national phase under 35 U.S.C. 371 of PCT International Application No. PCT/CAO 1/01275 which has an International filing date of Sep. 2001, which designated the United States of America, and which claims priority to U.S. provisional applications Ser. No. 60/220,601 filed Sep. 5, 2000 and U.S. Ser. No. 60/277,274 filed Mar. 3, 2001.

BACKGROUND OF THE INVENTION

1. Field of the Invention

The present invention relates to landscape grass surfaces and, more particularly, to a system and method for providing a synthetic grass landscape which is substantially free from organic matters.

2. Description of the Prior Art

It is sometimes desirable to discourage animals from frequenting a landscape area where they represent a nuisance. For instance, various methods have been developed for inhibiting bird-nesting at an airport. Airport runways are typically surrounded by natural grass surfaces, which in addition to requiring a great deal of maintenance, are associated with the presence of earthworms and other sources of nutriment for birds. As is well known, birds can cause considerable damages to aircraft and various procedures have been developed for effecting bird dispersal at airports, such as detonating cannons. However, such procedures have had limited success.

Another problem with natural grass surfaces in airfields is its inherent softness. Indeed, natural grass surfaces and the underlying soil are normally too soft to appropriately support an airplane in the event that the same moves off the runway. This may result in the airplane getting stuck in the soil surrounding the runway. Because of its inherent softness and irregularity, natural grass also constitutes a relatively poor emergency-landing surface.

Accordingly, there is a need for a new landscape grass surface which will contribute to reducing the flocks of animals at a given landscape location, while maintaining desirable soil conditions thereat.

SUMMARY OF THE INVENTION

It is therefore an aim of the present invention to provide a new runway surrounding surface which will contribute to eliminating birds from an airfield.

It is also an aim of the present invention to provide a new synthetic landscaping grass surface which is relatively easy to maintain.

It is a further aim of the present invention to provide a runway surrounding surface which offers improved vehicle support capabilities. It is a further aim of the present invention to provide a method for discouraging birds from frequenting an airfield where they represent a nuisance.

Therefore, in accordance with the present invention, there is provided an airport runway surrounding surface arrangement comprising a compacted soil surface substantially free from organic matters in order to restrict sources of nutriment for birds, a pile fabric placed over said compacted soil surface, said pile fabric including a plurality of pile elements resembling grass and extending from a backing mat to a predetermined height thereabove, a permeable ballast material for stabilizing said pile fabric in place, said permeable ballast material being provided on said backing mat and having a thickness less that said predetermined height, and a drainage system for directing water from said pile fabric to at least one drain, whereby an airfield is produced having substantially no organic nutrient.

In accordance with a further general aspect of the present invention, there is provided a runway bordering surface comprising a pile fabric laid over a compacted soil surface, said pile fabric including a plurality of pile elements resembling grass and extending from a backing mat to a predetermined height thereabove, a permeable ballast material for stabilizing said pile fabric in place, said permeable ballast material being provided on said backing mat and having a thickness less than said predetermined height, and a drainage system for directing surface water from said pile fabric to at least one drain.

In accordance with a further general aspect of the present invention, there is provided a method for discouraging birds from frequenting an airfield where they represent a nuisance, comprising the steps of: substantially clearing an airfield area surrounding an airstrip from organic matter susceptible to consumption by birds, leveling soil material in the airfield area, laying a synthetic grass surface over the soil material, and providing water drainage for evacuating water from said synthetic grass surface.

In accordance with a further general aspect of the present invention, there is provided an airport runway surface comprising a pile fabric adapted to be laid over a compacted soil surface, said pile fabric including a plurality of pile elements resembling grass and extending from a backing mat to a predetermined height thereabove, a permeable ballast material for stabilizing said pile fabric in place, said permeable ballast material being provided on said backing mat and having a thickness less than said predetermined height, a drainage system for directing surface water from said pile fabric to at least one drain, and runway markings incorporated in said pile fabric for guiding pilots along the airport runway surface during airplane taking-off and landing operations.

BRIEF DESCRIPTION OF THE DRAWINGS

Having thus generally described the nature of the invention, reference will now be made to the accompanying drawing, showing by way of illustration a preferred embodiment thereof, and in which:

FIG. 1 is a cross-sectional view of a synthetic grass surface bordering an airport runway in accordance with a preferred embodiment of the present invention.

FIG. 2 is a cross-sectional view of an artificial grass airport runway.

DESCRIPTION OF THE PREFERRED EMBODIMENTS

Referring now to FIG. 1, the present invention will be described in the context of an airport. However, it is understood that the present invention could be applied to other landscape areas.

FIG. 1 illustrates a synthetic grass surface 10 suited for replacing the natural grass normally surrounding the runways 12 (only one being shown) of an airfield. The term "runway" is intended herein to encompass the term "taxiway".

More specifically, the synthetic grass surface 10 comprises a pile fabric 14 adapted to be placed over a compacted earth surface 16 exposed by excavation.

During the excavation, the organic material contained in the uppermost stratum of the ground surrounding the runway 12 is removed. The ground must be excavated down to a compactable earth surface. At that point, the soil is leveled according to specifications and rocks are removed. The result is a surface that can be compacted by being rolled and shaped so that the flow of surface water will be controlled to specific locations.

The pile fabric 14 has a relatively thin, flexible backing mat or layer 18 with parallel rows of ribbons or pile elements 20 projecting upwardly from the mat 18 and resembling grass. The rows of pile elements 20 can be similar to that described in my co-pending Canadian Patent No. 2,218,314 filed on Oct. 16, 1997 and laid open on Sep. 10, 1998, the contents of which are herein incorporated by reference. A relatively thick layer of particulate material 22 forms the infill and is dispersed among the pile elements 20 on the mat 18. One of the roles of the infill is to act as a ballast for the pile fabric 14.

A thin impermeable membrane 24 is laid on the compacted earth surface 16 to prevent water from percolating down thereto. If a standard porous pile fabric was used with no underlying water barrier, the water would obviously percolate through the fabric and into the soil. Depending on specific soil condition, this could cause the soil to swell and soften and if a vehicle where to drive on that soil, it would make permanent tire tracks unless the ground was subsequently rolled when the moisture was still in the ground. Instead of draining the surface water into the soil, a draining layer 26, which can consist of a thick layer of aggregate, such as rock particles, is provided on the impermeable membrane 24 to allow the water to readily flow from the mat 18 onto the impermeable membrane 24 and into storm sewers (not shown) placed at specific locations. The compacted earth surface 16 is preferably slightly sloped to cause the water to flow towards the storm sewers. From experience, we have found that if an artificial grass is placed on natural soil with the organic material removed and the soil compacted, the sloped areas will stay more compact than the planar areas.

The particulate material 22 is preferably permeable so as to not retain the water but rather allow the same to readily flow downwardly through the synthetic grass surface 10 to the drainage layer 26. This is suitable in that otherwise the infill would retain a certain amount of moisture and eventually could promote growth of grass, weeds, or local wild vegetation.

The layer of particulate material 22 forming the infill preferably comprises a mixture of sand and binding polymer. The binding polymer will act as a stabilizer to prevent the sand from being displaced, for instance, by the thrust of the jet engines. Alternatively, at the edge of the runway or landscaped area, the layer of particulate material could consist of a mixture of cement and sand. Rock fragments, crushed stone chips and recycled plastics with a high weight ratio index could also be used. The strips bordering the runways are more apt of being driven on by the airplanes and maintenance vehicles, whereby these surfaces should have a greater firmness than the standard remaining portion of the synthetic grass surface 10 surrounding the runways 12. Furthermore, it is preferable to infill the strips bordering the runways 12 with a mixture of sand and cement to ensure that the bordering edges will stay down and will be easily vacuumed to prevent vegetal growth at the juncture of the runways 12 and the synthetic grass surface 10.

A mixture of fibers (2" to 6") and sand could also be used to form the layer of infill and or drainage base material. The infill could consist of a sand based system known under the trade mane of "Turf Grid" and using long fibers such as polypropylene or polyethylene fibers for stability. Turf grid can also be used as the support surface covering the water barrier in zones not apt to have an aircraft land on it. It is also noted that the water barrier could, depending on soil conditions, consist of the compacted earth surface itself. A more substantial base construction is necessary to support weight of large aircraft. However, small aircraft could land directly on the synthetic grass as the runway surface material. This could be most effective in arid area.

When rock fragments or other suitable aggregates are used as the infill, acrylic liquid or an adhesive can be sprayed thereon to stabilize the same and, thus, prevent dislodgment of the infilled material.

The spacing between the rows of pile elements 20 will be of at least 1 inch but preferably of 1⅛" to 1½". Wide row spacing advantageously allows using larger infill particles which inherently contribute to improve the overall stability of the infill 22. Indeed, more energy is required to displace larger particles. In certain instances, especially when coarse rock particles are used as the main component of the infilled material, no additional stabilizing agent, such as adhesive or binding agents, may be required. In other instances, an adhesive or a binding agent, such as cement, may only be required at the edges of the synthetic grass surface 10 adjacent the runways 12. The grass itself can also be of a higher density at areas closer to the jet blast zones if required and can be progressively lesser in density as the jet blast zone is reduced. The initial sections of artificial grass immediately adjacent to the runways or taxiways may be partially more dense and diminishing in density even in the same section of artificial grass regardless of its width (i.e.: either the first section of grass is entirely of a higher density of grass that may have a closer gauge of grass such as ⅜" or less and then the next section of grass may be progressively wider in gauge as the jet blast becomes less of a factor to the infill being displaced). The first section can also be of varying densities of grass. This higher density of grass may keep the infill in and completely eliminate the need to use a stabilizing agent in the infill or as part of the infill.

It is also contemplated to provide an anti-growth material into the synthetic grass surface 10 to prevent or at least delay the growth of weeds and root types of plants or natural grasses. For instance, the backing mat 18 could have slow release anti-growth pellets or similar treatment of the fabric adhered thereto again to prevent or retard growth.

In some airfield applications, there may be a need to have additional lighting on the sides of the runways 12 to improve visibility thereof, for instance, during airplane taking-off and landing operations. As illustrated in FIG. 2, this can be accomplished by incorporating a light source 28 in the pile fabric 14. The light source 28 could be provided by using a light reflective granular material, such as glass beads 30 to infill the grass 10 at appropriate locations on the airfield and by running a light emitting cable 32 in the synthetic grass 10 under the glass beads 30. This would make the grass 10 illuminated for numbers, arrows, directions, or any other type of marking necessary for a specific application. The cable could be provided in the form of a laser beam or a crystal light source. Light emitting diodes could also be used as a light source. The cable could be laminated to the backing mat 18. Other methods of lighting the field would be sealed miniature lights connected by a very low voltage current. Alternatively, a luminescent or reflective band of fabric material could be attached to the side edges of the pile fabric 14 adjacent the runways to highlight the same. The luminescence could come from a polypropylene fabric or other fabric having luminescent properties. The luminescent fabric would be extremely long wearing. A fiber optic cable could also be laminated to the fluorescent fabric material to also be a visual safety feature.

As illustrated in FIG. 2, two laterally spaced-apart parallel fiber optic cables 30 could be installed in the pile fabric 14 and covered with the glass beads 30 so as to form the runway side stripe markings of an airport runway. This is particularly useful for delimiting an airport runway zone when the synthetic grass is used as an airplane landing surface. It is understood that the above described light source could also be used to provide runway touchdown zone marking or runway center line markings.

By replacing the natural grass surface of an airfield by the synthetic grass surface 10, the presence of birds in the airfield can be significantly reduced due to the absence of nutrients which will normally attract the birds. Furthermore, the synthetic grass surface 10 constitutes a relatively safe emergency landing surface by reducing the risk of explosion from sparks igniting fuel during belly landings. It is understood that the load bearing capacity of such a landing strip would be designed for such a catastrophic event.

It is also contemplated to incorporate the drainage layer into the infill on the mat 18. In this particular case, a waterproof coating would be applied to the mat 18 to prevent water from percolating down to the underlying earth surface. The drainage layer or infill layer would preferably consist of crushed rock. The soil surface on which the mat 18 is laid would be sloped to cause surface water to flow on the mat 18 in a desired direction to a drain placed in the soil for receiving the surface water from the mat 18. This could eliminate the need for crushed stone underneath the mat 18.

What is claimed is:

1. An airport runway/taxiway surrounding surface arrangement comprising a compacted soil surface substantially free from organic matters in order to restrict sources of nutriment for birds, a pile fabric placed over said compacted soil surface, said pile fabric including a plurality of pile elements resembling grass and extending from a backing mat to a predetermined height thereabove, a permeable ballast material for stabilizing said pile fabric in place, said permeable ballast material being provided on said backing mat and having a thickness less that said predetermined height, and a drainage system for directing water from said pile fabric to at least one drain, whereby an airfield is produced having substantially no organic nutrient, wherein said drainage system includes a water drainage enabling layer, and a water barrier underlying said water drainage enabling layer for preventing water from percolating downwardly through the soil surface underneath said pile fabric, wherein said water barrier forms part of said backing mat, and wherein said water drainage enabling layer is provided in said pile fabric on said backing mat, wherein said water drainage enabling layer includes fibers dispersed among said pile elements on said backing mat.

2. An airport runway/taxi surrounding surface arrangement as defined in claim 1, wherein said water barrier defines a sloped surface to cause the water to flow in a desired direction thereon.

3. An airport runway/taxiway surrounding surface arrangement as defined in claim 1, wherein said water drainage enabling layer includes particulate material dispersed among said pile elements.

4. Airport runway/taxiway surrounding surface arrangement as defined in claim 1, wherein said ballast material includes particulate material dispersed among said pile elements, said particulate material being composed of particles cooperating to form therebetween flow paths to allow the water to flow to said water drainage enabling layer.

5. An airport runway/taxiway surrounding surface arrangement as defined in claim 4, further including a bonding agent mixed with said particulate material.

6. An airport runway/taxiway surrounding surface arrangement as defined in claim 5, wherein said bonding agent includes a mixture of cement and sand.

7. An airport runway/taxiway surrounding surface arrangement as defined in claim 1, wherein said water barrier includes an impermeable membrane laid on the soil surface.

8. An airport runway/taxiway surrounding surface arrangement as defined in claim 1, wherein said drainage enabling layer consists of a layer of aggregate.

9. An airport runway/taxiway surrounding surface arrangement as defined in claim 8, wherein said layer of aggregate includes rock particles.

10. An airport runway/taxiway surrounding surface arrangement as defined in claim 1, further including anti-growth material incorporated into the pile fabric to at least delay vegetation growth.

11. A runway/taxiway bordering surface comprising a pile fabric laid over a soil surface, said pile fabric including a plurality of pile elements resembling grass and extending from a backing mat to a predetermined height thereabove, a ballast material for stabilizing said pile fabric in place, said ballast material being provided on said backing mat and having a thickness less than said predetermined height, a drainage system for directing surface water from said pile fabric to at least one drain, and further including a light source incorporated in said pile fabric to provide runway side stripe markings.

12. A runway/taxiway bordering surface as defined in claim 11, wherein said drainage system includes a water barrier to prevent water from percolating downwardly through the compacted soil surface underneath said pile fabric.

13. A runway/taxiway bordering surface as defined in claim 11, wherein said ballast material includes particulate material dispersed among said pile elements, said particulate material forming a water permeable layer.

14. A runway/taxiway bordering surface as defined in claim 13, further including a bonding agent mixed with said particulate material at the edges of a runway to resist dislodgment thereof from said pile fabric.

15. A runway/taxiway bordering surface as defined in claim 14, wherein said bonding agent includes a mixture of cement and sand.

16. A runway/taxiway bordering surface as defined in claim 12, wherein said drainage system includes a drainage enabling layer provided on said water barrier.

17. A runway/taxiway bordering surface as defined in claim 16, wherein said backing mat is permeable, and wherein said water barrier is formed underneath said backing mat and spaced therefrom by said drainage enabling layer.

18. A runway/taxiway bordering surface as defined in claim 16, wherein said water barrier is formed on said backing mat.

19. A runway/taxiway bordering surface as defined in claim 11, wherein said light source includes a band of luminescent material provided at a lateral edge of said pile fabric.

20. A runway/taxiway bordering surface as defined in claim 11, wherein said light source includes at least one luminous member running through said pile fabric on said backing mat.

21. A runway/taxiway bordering surface as defined in claim 20, wherein said pile fabric is infilled with glass beads over and around said luminous member, and wherein said luminous member is elected from a group consisting of: a laser beam, light emitting diodes and a crystal light source.

22. An airport runway surface comprising a pile fabric adapted to be laid over a compacted soil surface, said pile fabric including a plurality of pile elements resembling grass and extending from a backing mat to a predetermined height thereabove, a permeable ballast material for stabilizing said pile fabric in place, said permeable ballast material being provided on said backing mat and having a thickness less than said predetermined height, a drainage system for directing surface water from said pile fabric to at least one drain, and runway markings incorporated in said pile fabric for guiding pilots along the airport runway surface during airplane taking-off and landing operations.

23. An airport runway surface as defined in claim 22, wherein said runway markings include a light source.

24. An airport runway surface as defined in claim 23, wherein said light source includes at least one light source member selected from a group consisting of: a laser beam, light emitting diodes and crystal light source.

25. An airport runway surface as defined in claim 24, wherein said light source further includes a plurality of reflective particles distributed in said pile fabric above and around said light source member.

26. An airport runway surface as defined in claim 25, wherein said light source includes two laterally spaced-apart light source cables, said pile fabric being infilled over and around said cables with said reflective particles so as to provide runway side stripe markings.

27. An airport runway surface as defined in claim 24, wherein said light source member is laminate into the pile fabric.

28. An airport runway surface as defined in claim 23, wherein said light source includes a band of luminescent fabric material incorporated to said pile fabric.

29. An airport runway surrounding surface arrangement comprising a compacted soil surface substantially free from organic matters in order to restrict sources of nutriment for birds, a pile fabric placed over said compacted soil surface, said pile fabric including a plurality of pile elements resembling grass and extending from a backing mat to a predetermined height thereabove, a permeable ballast material for stabilizing said pile fabric in place, said permeable ballast material being provided on said backing mat and having a thickness less that said predetermined height, and a drainage system for directing water from said pile fabric to at least one drain, whereby an airfield is produced having substantially no organic nutrient and further including anti-growth material incorporated into the pile fabric to at least delay vegetation growth.

30. An airport runway surrounding surface arrangement as defined in claim 29, wherein said drainage system includes a water drainage enabling layer, and a water barrier underlying said water drainage enabling layer for preventing water from percolating downwardly through the soil surface underneath said pile fabric.

31. An airport runway surrounding surface arrangement as defined in claim 30, wherein said backing mat is permeable and laid on said water drainage enabling layer.

32. An airport runway surrounding surface arrangement as defined in claim 30, wherein said water barrier forms part of said backing mat, and wherein said water drainage enabling layer is provided in said pile fabric on said backing mat.

33. airport runway surrounding surface arrangement as defined in claim 31, wherein said water barrier includes an impermeable membrane laid on the soil surface.

34. An airport runway surrounding surface arrangement as defined in claim 32, wherein said water drainage enabling layer includes fibers dispersed among said pile elements on said backing mat.

* * * * *

UNITED STATES PATENT AND TRADEMARK OFFICE
CERTIFICATE OF CORRECTION

PATENT NO.    : 6,946,181 B2
DATED         : September 20, 2005
INVENTOR(S)   : Jean Prevost It is certified that error appears in the above-identified patent and that said Letters Patent is hereby corrected as shown below:

<u>Column 5,</u>
Line 56, delete "runway/taxi" and insert -- runway/taxiway --.

<u>Column 7,</u>
Line 34, delete "laminate" and insert -- laminated --.

Signed and Sealed this

Third Day of January, 2006

JON W. DUDAS
*Director of the United States Patent and Trademark Office*

UNITED STATES PATENT AND TRADEMARK OFFICE
CERTIFICATE OF CORRECTION

PATENT NO. : 6,946,181 B2  Page 1 of 1
DATED : September 20, 2005
INVENTOR(S) : Jean Prevost It is certified that error appears in the above-identified patent and that said Letters Patent is hereby corrected as shown below:

<u>Title page,</u>
Item [60], Related U.S. Application Data, delete "60/220,601" and insert -- 60/229,601 --.

<u>Column 1,</u>
Line 8, delete "60/220,601" and insert -- 60/229,601 --.

Signed and Sealed this

Ninth Day of May, 2006

JON W. DUDAS
*Director of the United States Patent and Trademark Office*